United States Patent

[11] 3,577,829

| [72] | Inventors | James Hurn<br>Rowley, Melksham, Wiltshire;<br>Charles Richard Forbes King, 6 Somerset Lane; Donald Raymond Deane, Foxhall Farm, Weston, Bath, Somerset, England |
|---|---|---|
| [21] | Appl. No. | 757,912 |
| [22] | Filed | Sept. 6, 1968 |
| [45] | Patented | May 4, 1971 |
| [32] | Priority | Sept. 13, 1967 |
| [33] | | Great Britain |
| [31] | | 41799/67 |

[54] METHOD AND APPARATUS FOR CUTTING COMPONENTS TO LENGTH
17 Claims, 9 Drawing Figs.

[52] U.S. Cl. ............................................. 90/21R,
83/468, 143/47R, 269/303, 90/11R
[51] Int. Cl. ...................................................... B23c 9/00,
B26d 7/16, B27b 5/18
[50] Field of Search.......................................... 90/21, 11;
143/47, 47 (3), 47 (6), 46, 46 (1), 46 (47), 46 (55), 168 (6), 174; 144/2 (10); 83/467, 468, 268, 269, 391; 269/303, 315, 320; 198/(Inquired)

[56] References Cited
UNITED STATES PATENTS

| 2,742,935 | 4/1956 | Acton | 143/46-X |
| 3,155,242 | 11/1964 | Magloire | 83/269-X |
| 3,263,716 | 8/1966 | Albers | 143/46-1-X |
| 3,343,644 | 9/1967 | Kljuchnikov et al. | 143/46-X |
| 3,307,494 | 2/1968 | Schenck | 83/467-X |

*Primary Examiner*—Gil Weidenfeld
*Attorney*—Shoemaker and Mattare

ABSTRACT: Apparatus and method for positioning an elongate workpiece so that it may be worked, e.g. by cutting, sawing, drilling, trenching or shearing, at any preselected point along its length, including the steps of passing the workpiece from a working tool on a longitudinal conveyor; selecting a stop from a plurality of such stops which are serially spaced from said working tool over at least part of the length of the conveyor; adjusting the longitudinal position relative to the conveyor and to the working tool of a common structure carrying said stops, the distances between the stops being uniform, and placing said selected stop in the path of the workpiece to arrest its further progress on the conveyor. Pneumatic cushioning means are interposed between the common structure and the means for adjusting the common structure. The cushioning means are employed to absorb impact by allowing limited movement to the common structure when the workpiece abuts the selected stop, and then to reverse the said movement of the common structure to reposition the stop and hence to bring the preselected location of the workpiece opposite the working tool.

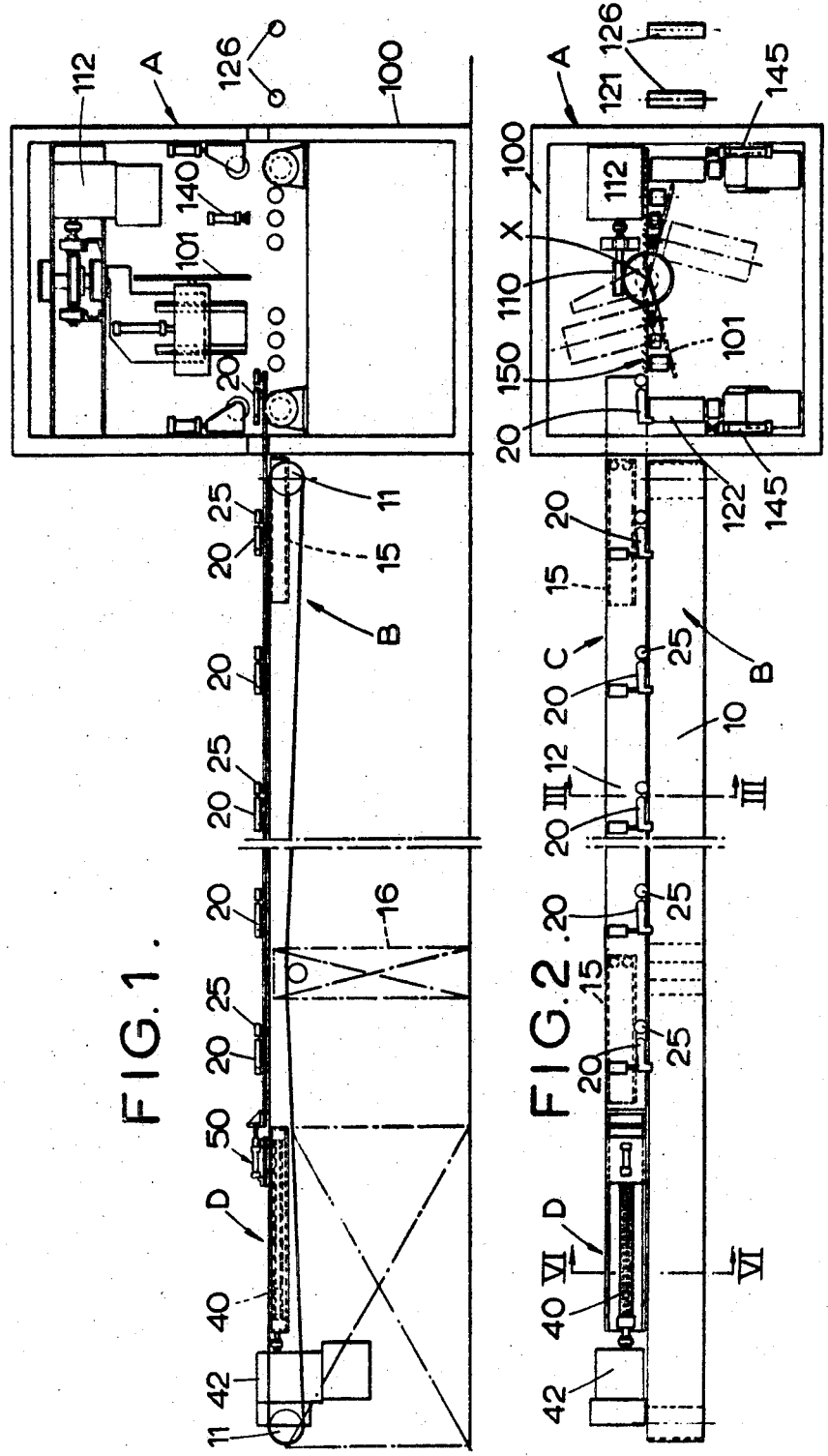

Patented May 4, 1971
3,577,829
5 Sheets-Sheet 2
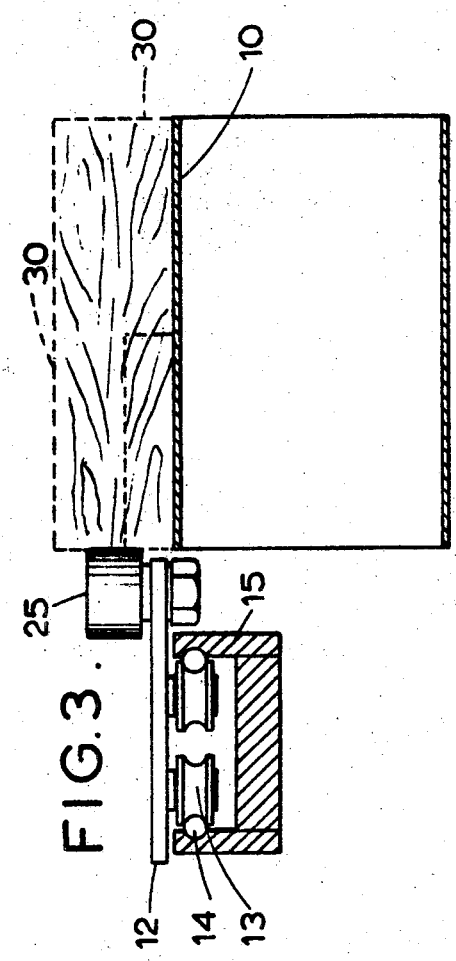
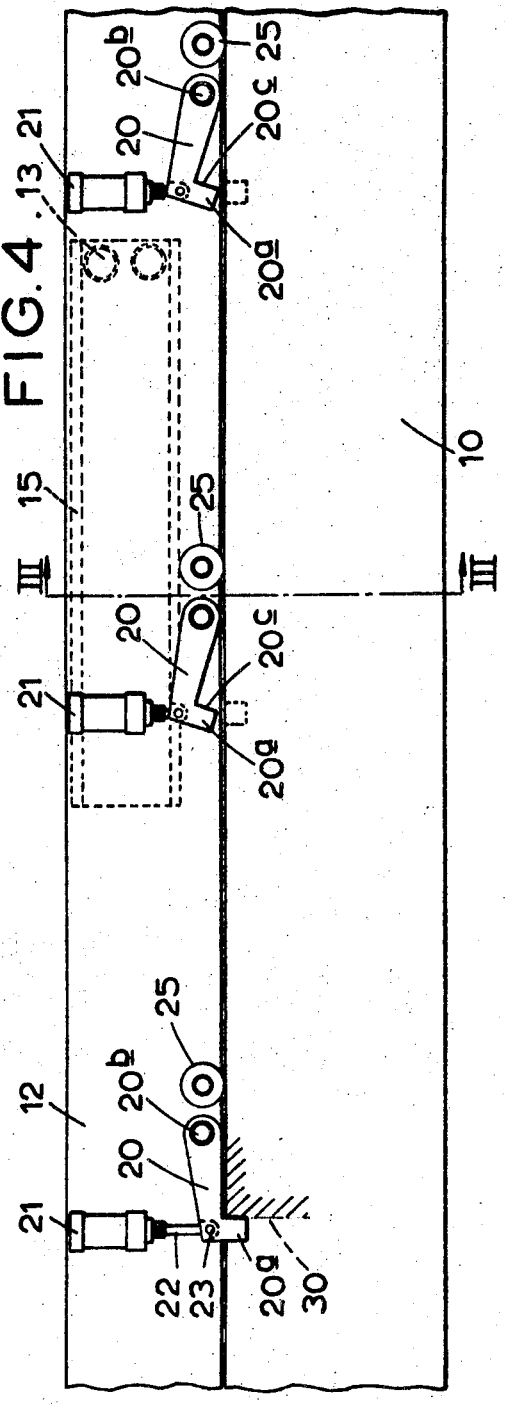
INVENTORS
James Hurn
Charles Richard Forbes King
Donald Raymond Deane
By Shoemaker and Mattare
ATTORNEYS

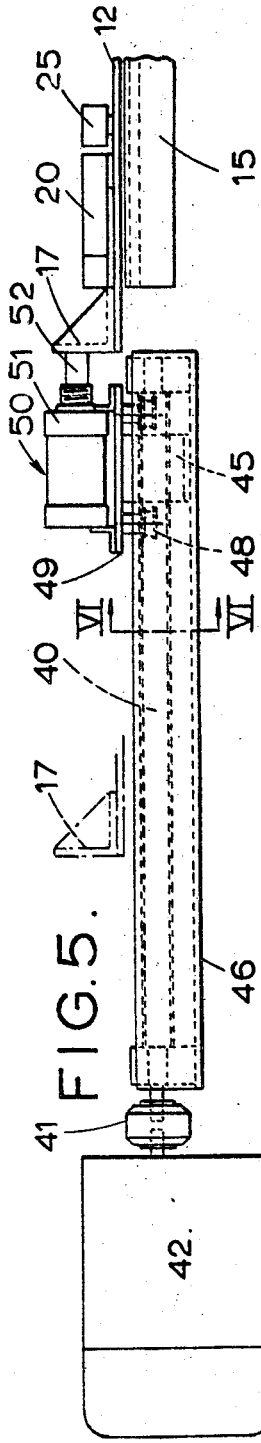
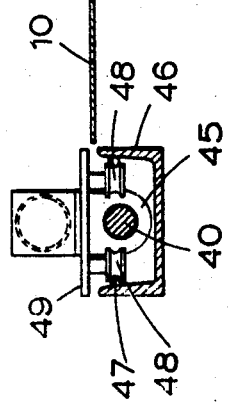
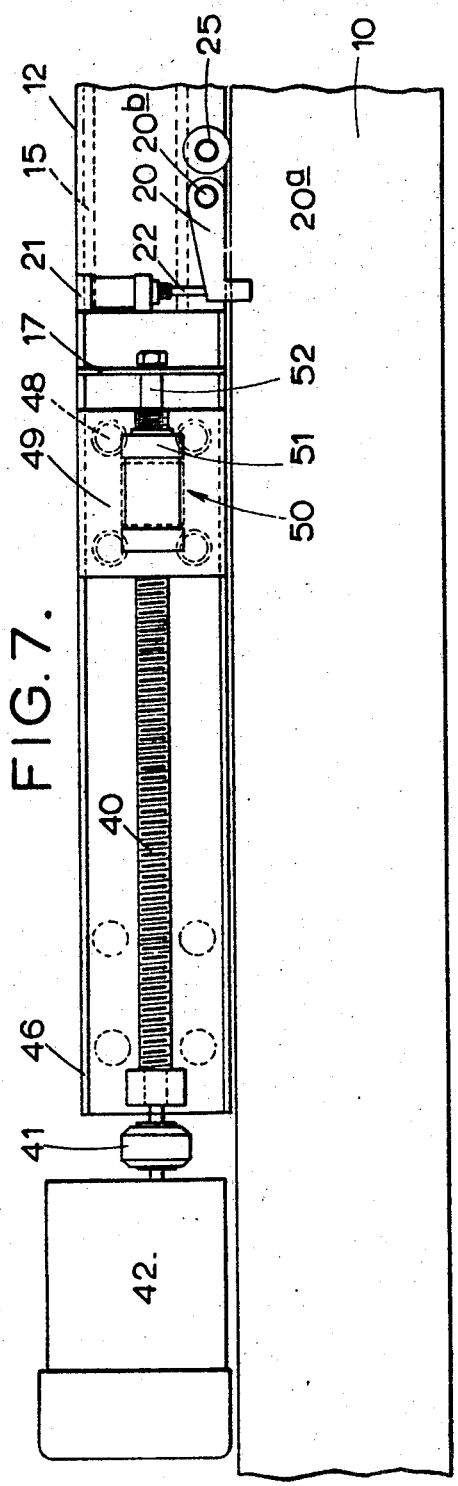

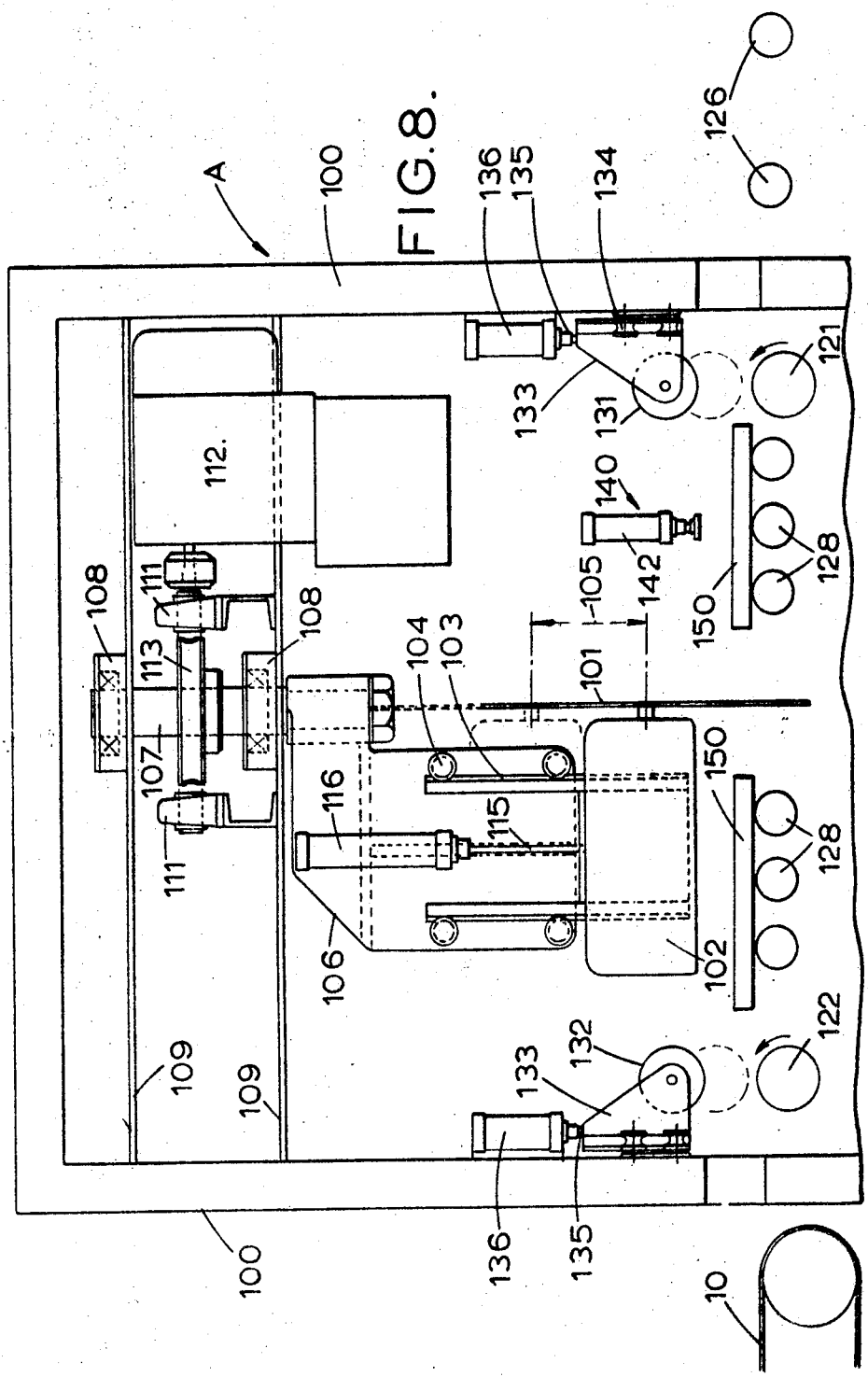

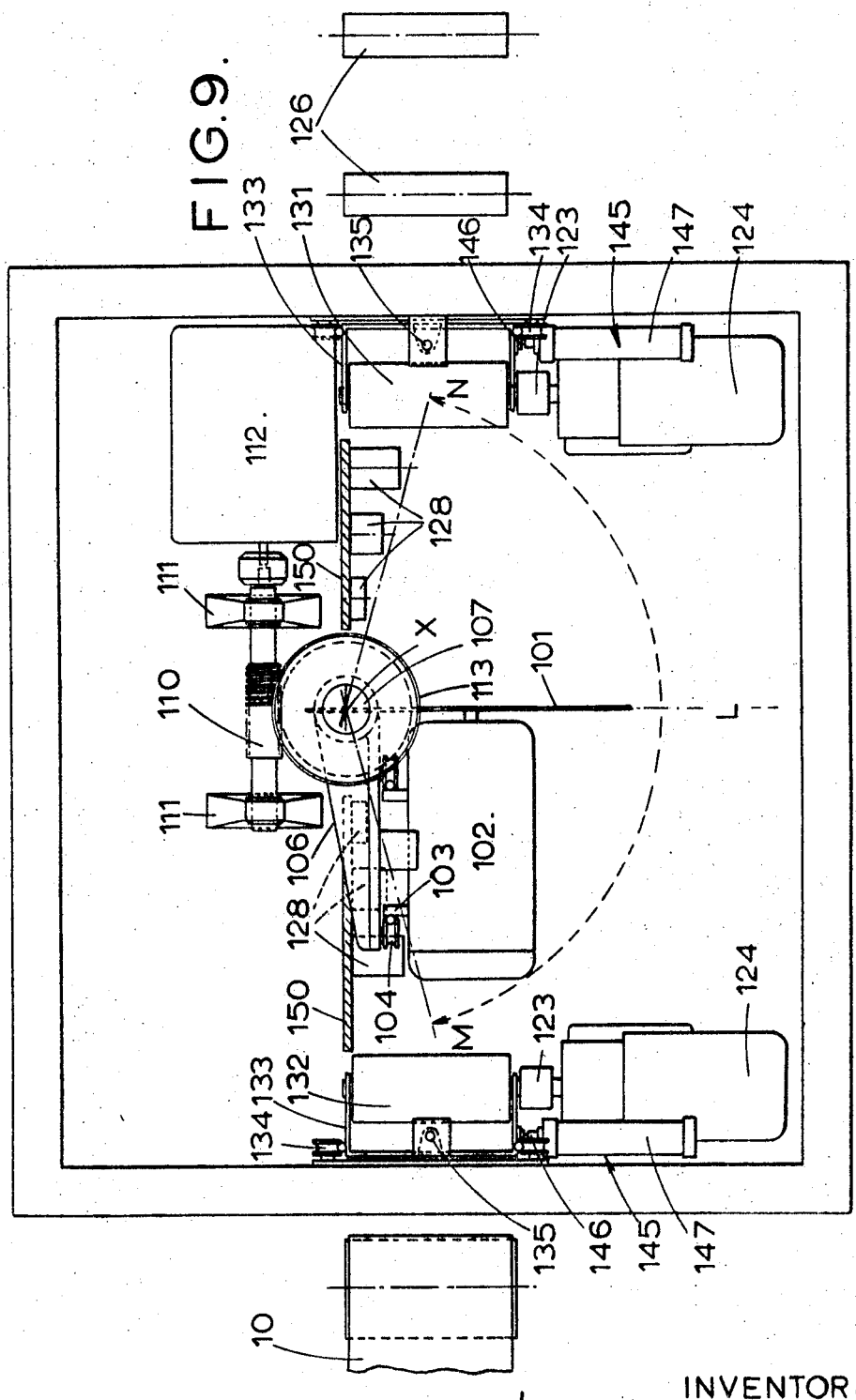

METHOD AND APPARATUS FOR CUTTING COMPONENTS TO LENGTH

This invention relates to methods and apparatus for positioning an elongate workpiece such as a length of timber or of metal in bar, sheet, tubular, or other form, so that it may be cut or worked at any preselected place along its length.

The invention has for a particular object to provide a method and apparatus whereby lengths of timber or of metal may be accurately cut to length. However, although the following description is principally concerned with the cutting of elongate workpieces to length, i.e. where the working operation is a cutting operation, the invention is equally applicable where the working operation is drilling, milling, trenching or shearing, or other analogous operation.

Broadly stated, the present invention provides a method of positioning an elongate workpiece so that it may be worked, e.g. by cutting, sawing, drilling, trenching or shearing, at any preselected point along its length, including the steps of passing the workpiece from a working tool on a longitudinal conveyor, selecting a stop from a plurality of such stops which are serially spaced from said working tool over at least part of the length of the conveyor, adjusting the longitudinal position relative to the conveyor and to the working tool of a common structure carrying said stops, the distances between the stops being uniform, and placing said selected stop in the path of the workpiece to arrest its further progress on the conveyor.

The stops are uniformly spaced apart over a distance (hereinafter termed a module) which may, for example, be 2 ft. or 1 meter and as the stops are serially spaced from the working tool and are uniformly spaced apart by such a module of length, selection of one of the stops will provide a multiple of the module of length whereas a fraction of the module of length is catered for by adjusting the relative longitudinal position of the working tool and the common structure carrying all the said stops. Such adjustment may be effected by moving the working tool relative to the structure or vice versa.

Preferably the apparatus for carrying out the above method includes:

a. a work station incorporating a working tool, b. longitudinally extending conveyor means passing the workpiece in a direction away from the working tool, c. a series of stops uniformly spaced apart over at least part of the length of the conveyor means, any selected one of which may be brought into the path of the workpiece to arrest its further progress on the conveyor means, d. a common structure which carries the stops and which is reciprocal longitudinally over a stroke at least equal to the spacing between adjacent stops, and e. means for adjusting the longitudinal position of the structure to any preselected point within said stroke.

According to an essential feature of this invention pneumatic cushioning means are interposed between the common structure carrying the stops and the adjusting means for the said structure, which adjusting means is conveniently in the form of a leadscrew mechanism, and said pneumatic cushioning means is operative when the workpiece abuts the selected stop to absorb shock on impact by permitting limited longitudinal movement of the common structure relative to the conveyor means. Said cushioning means includes a pneumatic ram operation on the structure which is effective to reverse the movement of the common structure after abutment of the workpiece with the selected stop and hence to bring the preselected location of the workpiece accurately to position at the work station.

The work station will incorporate a working tool, for example a saw, a grinding wheel, a drill, a trenching tool or a shear, and such tool may operate in conjunction with a lateral fence while the working station may incorporate lateral rams for holding the workpiece against such lateral fence during the working operation.

Instead of a leadscrew mechanism, the adjusting means may comprise a rack and pinion mechanism or even an hydraulically operated positional device, or other device performing an analogous function.

One embodiment of the invention will be described by way of example with reference to the accompanying drawings, in which:

FIGS. 1 and 2 are diagrammatic side and plan views respectively of the complete apparatus, FIG. 3 is a transverse cross-sectional view to larger scale of detail features and is taken on the lines III–III of FIG. 2, and of FIG. 4 which is a plan view to larger scale of the features shown in FIG. 3.

FIG. 5 is a detail side view of the stop positioning mechanism which is also shown at the extreme left hand side of FIGS. 1 and 2, FIG. 6 is a transverse cross-sectional view taken on the lines VI–VI of FIGS. 2 and 5, FIG. 7 is a plan view of the mechanism shown in FIG. 5, FIGS. 8 and 9 are diagrammatic elevational and plan views respectively of a work station employing as tool a cutting and mitering saw.

The machine shown in FIGS. 1 and 2 has a work station generally designated A, and extending from the work station, a longitudinal conveyor generally designated B. Running alongside the conveyor B is a structure generally designated C which is reciprocal longitudinally under the control of adjustment means generally designated D.

The work station A has a frame 100 fixed to the floor and incorporates a tool which operates in a vertical plane drawn through the position indicated at X in FIG. 2. In the embodiment illustrated in the drawings and, as will be later described in greater detail with reference to FIGS. 8 and 9, the tool is a circular saw 101 arranged to descend during its working stroke. However, the tool may alternatively be a grinding wheel, a shear, a trenching tool or a drill. During its working stroke the tool may travel vertically, horizontally or at an angle to the horizontal, always provided that its working stroke lies substantially in the same vertical plane as the position X indicated in FIG. 2, which position serves as a datum point, from which lengths are measured in the machine.

The conveyor B may be in the form of rollers but, in the embodiment shown, it is in the form of an endless belt 10 running on rollers 11. During operation the upper run of the belt is moved in the direction to the left of FIG. 1. One or more of the rollers 11 may be driven to effect such movement.

Extending alongside the belt 10 is the structure C. This, in the embodiment shown, includes a continuous metal beam 12 having on its underside grooved rollers 13 riding on tracks 14 carried in channel sections 15 (FIGS. 3 and 4). The channel sections are fixed to a base frame of the machine (16 in FIG. 1) which in turn will be fixed to the floor.

Mounted on the beam 12 and serially spaced from the datum position X is an aligned row of stops 20 which are each pivotally mounted on trunnions 20b (FIG. 4) fixed to the beam 12. The stops 20 are equally spaced from one another. As shown in FIG. 4 each stop is controlled by a fluid-operated ram and cylinder device, the cylinder 21 of which is fixed on the beam 12 while the ram 22 is connected to its associated stop 20 by a trunnion pin 23. In FIG. 4 the right-hand stop 20 is shown in its inoperative position while the left-hand stop 20 is shown in an operative position where its nose 20a is located over the belt 10 and in this position will obstruct the passage of a workpiece, for example a length of timber 30 (FIG. 4), being conveyed on the belt 10.

When the nose 20a of a stop 20 is struck by the leading end of a workpiece, a major part of the shock is transmitted by trunnion 20b to beam 12 and only a minor part of the shock force is communicated to the ram 22 associated with that stop 20. Hence, the rams 22 do not require high forces of fluid pressure when operated to move their associated stops 20 to the operative or inoperative position.

Associated with the cylinders 21 of all the stops 20 will be a pressure fluid circuit of known kind (not shown) which will be arranged such that all the rams 22 will normally be held withdrawn in their cylinders 21, so that the associated stops are held in their inoperative or retracted positions.

When it is desired to move a selected stop 20 to its operative position, fluid pressure will be applied in the cylinder 21 associated with that stop to cause the ram 22 in that cylinder to move out. When it is later desired to retract the stop, the fluid pressure will be switched to cause the ram to withdraw.

Spring means may be included which are arranged either to urge the rams 22 towards their withdrawn positions or to urge the stops to their retracted positions.

Switching of the selected rams may be effected manually by push button control of the fluid circuit or by a master control governed by preprogrammed tape or analogous means. The fluid circuit is preferably a pneumatic circuit.

Rollers 25 are also mounted on the beam 12 and are equally spaced from one another. These rollers constitute a guide fence along one side of the belt 10.

With reference to FIG. 3, a wide range of sizes of timber components can be accommodated. However, the timber should not be wider than the belt 10 and should not be so thin that it cannot engage the rollers 25.

It will be understood that the beam 12 is reciprocal longitudinally with the rollers 13 riding on tracks 14 in channel sections 15.

Control of the reciprocal movement of the beam 12 is effected with the aid of the mechanism D which is shown in greater detail in FIGS. 5, 6 and 7.

The adjusting mechanism D in the embodiment illustrated comprises a leadscrew 40 driven by way of a coupling 41 from a positional gearbox 42. The positional gearbox may be operated manually or by a remote control, as will be hereafter described, from a positional and sequence control mechanism which can be preprogrammed with the use of punched tape or analogous means. Such a mechanism is well known and may also be used to control other operations in sequence as will be apparent from the later description.

Rotation of the leadscrew 40 effects longitudinal movement of a nut 45. Torque reaction on the nut 45 is absorbed by providing a fixed channel 46 having tracks 47 on which ride wheels 48 of a carriage 49 to the underside of which the nut 45 is fixed.

On the upper side of the carriage 49 is mounted a cushioning device generally designated 50. This comprises a cylinder 51 fixed to the carriage 49 and operating in the cylinder 51 a pneumatically actuated ram 52. The ram 52 is rigidly connected to a bracket 17 secured to the beam 12.

During operation of the machine, pneumatic pressure is applied in the cylinder 51 such that its ram 52 is urged fully outwardly. Means are preferably arranged whereby the pressure of the air applied is adjustable, and moreover, the pressure of air acting on the ram 52 may be augmented by a coil spring or other cushioning means also tending to urge the ram 52 fully outwardly.

The cushioning device 50 operates to absorb shocks between the beam structure C and the leadscrew 40.

In the arrangement as shown, when one of the stops 20 is moved to its operative position so that its nose 20a is interposed in the path of a length of timber travelling along belt 10, the timber, which may weigh up to say 300 lbs., may impart a severe shock which is transmitted to the beam 12 causing it to move, with its rollers 13 rolling on tracks 14 of the channel sections 15. Such loading is transmitted by way of the bracket 17 to the ram 52 and, if the loading is high, the ram may move inwardly over its whole stroke within the cylinder 51. However, as air pressure acts continuously in the cylinder 51 and tends to urge the ram 52 outwardly, the beam 12 is eventually returned together with the operative stop 20 which moves the length of timber backwardly on the belt 10. Preferably, there is associated with ram 52 a limit switch (not shown) which is operated when the ram regains its fully outward condition and this switch is effective to cause interruption of the driving means effecting longitudinal movement of the workpiece on the belt 10. Such drive means will be described below.

It will be appreciated that the cushioning device 50 is effective not only to absorb shocks applied to the beam 12 and prevent these being transmitted in their entirety to the leadscrew 40, but also to reposition the beam 12 after it has been moved longitudinally when receiving shock.

It is to be understood that the number of stops and the distance between each of the stops 20 is purely arbitrary. If the metric system is being used for measuring the length of the components being worked, the interval between successive stops may be a metric distance. This distance between successive stops constitutes a module of length and essential features of the apparatus are that:

a. the module is the same for all stops 20, b. the full range of movement of the nut 45 as effected by the leadscrew 50, i.e. the stroke, is at least as great as the module.

If the stroke of the leadscrew is 1 module of length the position of any stop will be adjustable through 1 module of length by operating the leadscrew. Thus, referring to FIGS. 1 and 2, if the first stop is located 1 module from datum position X when the nut 45 is at the extreme right-hand position relative to the leadscrew 40, then on rotation of the leadscrew to move the nut 45 to the left through 1 module, the first stop will also be moved through 1 module and will then be located at a distance of 2 modules from X.

Any suitable ratio may be employed, for example, if one hundred rotations of the leadscrew effects adjustment through 1 module, 50 rotations will effect adjustment through 50 percent of a module.

For the purpose of illustrative example, let it be assumed as follows:

No. of stops = 6
Module = 1 meter
Leadscrew rotations per module = 100.

Also, let it be assumed that when the leadscrew is at its starting position, that is when the nut 45 is at the right-hand end of the leadscrew, referring to FIGS. 1, 2, 5 or 7, the first stop (i.e. that nearest the tool) is located exactly 1 meter from datum position X, with this measurement being made when the stop is in its operative position and taken from the face 20c of its nose 20a indicated in FIG. 4.

If now, it is desired to measure a length of 4.57 meters from position X, the fourth stop, which is initially 4 metres from X, is selected and brought to its operative position, while the leadscrew is operated through 57 revolutions so that from its initial position the fourth stop is moved 0.57 meters further away from datum position X. When this is effected the face 20c of the nose 20a of the fourth stop 20 will be located exactly 4.57 meters from datum position X.

If now an elongate workpiece, for example a length of timber, is fed along the conveyor belt 10 and is maintained close to the guide fence constituted by the rollers 25, its leading end will strike the face 20c of the fourth stop 20. THe force of input will be cushioned by the device 50, which will take up any movement of the beam 12 occasioned by the impact, and then reverse the beam so that the leading end of the component will be repositioned 4.57 meters from datum position X.

With the example just given, the mechanism, having six stops 20, will be able to position a component so that any point along its length, which is between 1 meter and 7 meters from its leading end can be brought opposite the datum position X. Selection of one of the stops will meters for multiples of one meter adjustment of the leadscrew will cater for fractional measurements. The maximum length measurable will depend on the number of stops and the spacing between the stops.

The degree of adjustment is dependent upon the pitch of the leadscrew 40 and the gearing applied to control leadscrew rotation. If the leadscrew is afforded fine pitch and is governed by gearing capable of controlling leadscrew rotation to within small fractions of a revolution, very high degrees of accuracy can be obtained. If the adjustment is relatively coarser, the process of adjustment will be effected more quickly but with a lower degree of accuracy.

However, an important advantage of the mechanism so far as described is that adjustment of the leadscrew and selection of the stops is readily susceptible to automatic control by remotely located sequence and positional control mechanism of known kind. With the aid of such control mechanisms, the adjustment of the leadscrew for a given length may be effected with a high degree of accuracy while a working operation is still being carried out on a workpiece, which has been previously positioned for length. This will be made clear from the operation of the timber cutting machine given below with reference to FIGS. 8 and 9 where a work station is shown employing as tool, a cutting and mitering saw.

The work station indicated in these drawings includes a rotary saw 101 driven by a motor 102. THe motor is mounted for vertical sliding movement on slides 103 cooperating with rollers 104 to give a working travel indicated at 105. The rollers 104 are carried on a cranked arm 106 carried on a vertical trunnion 107.

The vertical trunnion 107 is supported for rotational movement by bearings 108 mounted on cross members 109 of frame 100. The axis of rotation of the trunnion 107 passes through datum position X.

A worm drive screw 110 is supported for rotation on bearings 111 and is driven by positional gear box 112. The worm drive screw 110 engages a pinion 113 fixed on trunnion 107.

By suitable adjustment of worm drive screw 110, the trunnion will be rotated carrying with it the cranked arm 106, saw motor 102 and in this way the saw 101 may be adjusted through an angle to either side of the centerline position XL shown in FIGS. 8 and 9. The maximum degree of such adjustment permitted in the embodiment shown on the drawings is 75° (to lines XM and XN to either side of the centerlines XL). However, in whatever position to which it may have been adjusted, during its working stroke 105 the saw operates in a vertical plane, in which lies the datum position X and the axis of rotation of trunnion 107.

Vertical movement of the saw is controlled by a fluid-operated double-acting ram 115 moving in cylinder 116 fixed to cranked arm 106.

Mounted within frame 100 are driven in-feed and out-feed rollers 121 and 122 respectively, each of which is driven through a disengageable clutch 123 by a drive motor 124. The upper edges of the drive rollers 121 and 122 are at approximately the same level as the upper run of belt 10.

Reference numerals 126 represent in-feed rollers located externally of work station 100, while within work station 100 are mounted idler rollers 128 which, as will be seen in FIG. 9, are appropriately arranged as to their width so as to accommodate the maximum angle to which saw 101 may be adjusted, and as will be hereafter explained to allow off-cuts to fall.

Cooperating with in-feed roller 121 is an idler roller 131, while cooperating with out-feed roller 122 is an idler roller 132. The idler rollers 131 and 132 are each carried on brackets 133 which are vertically slidable on rollers 134 under the control of fluid-operating double-acting rams 135 moving in cylinders 136.

Cooperating with one of the idler rollers 128 on the input side of the saw 101 is a vertically operating clamping device 140 comprising a fluid-operated ram 141 working in cylinder 142. Also mounted within the frame 100 are horizontally operating clamping devices 145 having fluid-operated double-acting rams 146 moving in cylinders 147 (FIG. 9).

Finally, within the work station A is a fixed fence 150. This may be in the form of rollers rotating about vertical axes, or it may be in bar form as shown in the drawings, The fence 150 whatever its form, constitutes an abutment against which a workpiece may be held by the horizontal clamping devices 145, and when so held the workpiece will have its edge located immediately beneath the axis of rotation of the trunnion 107. It will be appreciated that the fence 150 requires to have a central gap in which the saw 101 or analogous tool operates.

The cutting and mitering saw illustrated in FIGS. 8 and 9, and the positioning mechanism previously described, are operated in conjunction, for example as follows:

A selected stop 20 is moved to its operative position and the leadscrew 40 is adjusted to position the selected stop 20 accurately at the required distance from the datum position X. At this stage the worm drive screw 110 is operated by positional control motor 112 to adjust the angle of saw 101 to the desired angle of cut. A length of timber is then fed into the machine over the external rollers 126 and as soon as it enters the work station A, the rams 135 controlling the pressure rollers 131 and 132 are operated to hold the timber against driven rollers 121 and 122 which are rotated by their motors 124, their clutches 123 being engaged. The length of timber is passed through work station A and on to belt 10 until its leading end abuts against the selected stop 20. The fluid circuitry controlling rams 135 incorporates a sensing device whereby the rollers 131 and 132 are only lowered when a workpiece is present.

When the timber strikes the selected stop 20 the driving force collapses the cushioning device 50 and this activates a pressure switch, which in turn brings into operation the following cycle.

a. the drive motors 124 are disconnected from the driving rollers 121 and 122 by disengagement of the clutches 123.

b. The idler pressure rollers 131 and 132 are raised by fluid operated rams 135.

Meanwhile, the cushioning device 50 is reversing and repositioning the timber and as its ram 51 reaches its fully outward position, it activates a pressure switch which is effective to set the following operation in train.

Firstly, the horizontal side clamps 145 are actuated to engage the timber and urge it against the side fence 150. Secondly, the idler pressure rollers 131 and 132 are operated to clamp the timber against the now stationary drive rollers 121 and 122. Thirdly, the vertical clamp 140 operates to clamp the timber against its associated idler roller 128. If one or more of the rollers 11 of belt 10 is driven, such drive is interrupted.

When the timber has been so clamped, the stop 20 which has been used to arrest its progress along the conveyor belt 10 can be withdrawn and moved to its inoperative position and at the same time the leadscrew 40 can be utilized to reposition the beam 12 so that the stop which will be utilized during the next following working operation will be correctly spaced from datum position X.

While the timber is held clamped, the saw 101 is fed downwardly under the control of ram 115 operating in cylinder 116 to a predetermined depth and returns. When it returns, the saw positioning worm drive screw 110 may be operated by way of positional gear box 112 to reposition the saw if the immediately succeeding working operation requires such repositioning. When the saw returns the vertical clamps 140 are disengaged as are the side clamps 145.

Drive to the out-feed roller 122 is reconnected by its clutch 123 and the timber is ejected. If drive to belt 10 has been interrupted, this is now resumed.

Off-cuts, if sufficiently long will be passed forward by drive roller 121 and then engaged by drive roller 122 and passed out from the work station. If, however, the off-cuts are short and after having passed the drive roller 121, are not engaged by the drive roller 122, they will fall downwardly unless they are so narrow as to be supported by the idler rollers 128. A sweep arm (not shown) may be provided to deal with particularly narrow workpieces.

The work station is, after disposal of the off-cut, ready to receive the next length of timber to be cut, and it will be appreciated that, at this stage, the saw 101 has already been positioned for the next angle of cut, while the beam 12 carrying the stops has already been positioned by leadscrews 40, so that the selected stop required for the next cut, when operated, will have the operative face 20c of its nose 20a, accurately positioned from datum position X.

It will be appreciated that in many respects the relative dispositions of many of the components shown in the drawings is purely exemplary.

For example, the adjusting mechanism D and cushioning device 50 may not be located at one end of the beam structure C but instead may operate intermediately of its length and indeed may be reoriented through 90°.

In the embodiment illustrated, the conveyor means is constituted by the out-feed roller 122 in conjunction with the belt 10. This arrangement is preferred since with it the belt 10 can be operated independently of the roller 122 and hence can be used to transport a finished component while the roller 122 is stationary. However, the roller 122 can be dispensed with and the belt 10 can constitute the sole conveying means in which case the end roller 11 will be located closer to the working tool than is the case with the arrangement shown in the drawings.

Also in the arrangement shown, the roller 22 constitutes a level surface advantageous for clamping while if clamping were to be performed against the belt 10 less reliable results would be obtained.

Means, not shown, may be provided for removing a finished component from the belt 10 for delivery to a storage station or to a supply station, for example, a hopper, from which an assembly station is fed with components.

It will be appreciated that the machine described and illustrated is readily susceptible to control by a sequence and positional control mechanism. Such mechanisms are known which can be pre-programmed by means of punched or other recording tapes and which are capable of governing the sequence of operations of the various rams, clamps and clutches or associated fluid circuits, as well as operation of the positional gear boxes 42 and 112.

With the present invention it is possible to produce in the case of timber components, lengths accurately cut to the correct length and angle and the components can be so prepared, in the order in which they are required, for an assembly process carried out nearby on a repetitive cycle basis.

For example, in an assembly process in which trussed rafters are being made, as many as 10 timber components may be required for each rafter, each of which components differs from another both as to length and as to the miter angles applied to its ends.

The present invention renders it possible to facilitate the supply of such elongate timber components for each frame, and for successive frames thereafter, and even more advantageously to supply the requisite components for two or even more assembly stations, each of which assembly stations may consume as many as 10 timber components required for a single truss every 2 minutes. Two such assembly stations will consume 20 components every 2 minutes and it has been a problem heretofore to supply the requisite numbers of timber components while still maintaining accuracy, such supply being directly from a sawing machine to an assembly station.

A principal elemental part of such problem, especially in small assembly runs, has been the setting up time of the sawing machine, in particular where a plurality of saws is employed. This problem has arisen since with most previous machines setting up cannot be performed while an existing operation is in progress.

However, an underlying feature of the method and apparatus provided according to this invention is that the positioning apparatus is operable independently of the apparatus associated directly with the working tool. In particular, as has been described above, while the tool is still in process of operation on a given workpiece, the positioning apparatus e.g. stops 20, beam 12 and adjusting mechanism D, can be operated in preparation for the next following workpiece and later, while they are in process of positioning such following workpiece, the working tool can be repositioned as may be necessary for its working operation on the said following workpiece. This is particularly advantageous where the working operation is required to vary continuously with successive workpieces. The present invention provides the ability to vary for successive workpieces, the length as well as the angle of cut, with practically negligible intervals between successive operations however much they may vary from one another.

Notwithstanding that the above description is mainly directed to the operation of a saw adapted to cut timber components to length, it will readily be appreciated that the invention is easily adapted to the cutting of lengths of material other than timber, and that it is also adapted for operations other than cutting operations by saw.

The apparatus provided according to the invention is indeed adaptable to any operation where it is required to perform a working operation on an elongate component at a preselected position along its length and the present invention provides apparatus for positioning such an elongate component with great speed and accuracy so that such a working operation can be performed. Where the operation is drilling or trenching, a succession of such operations can be carried out at various successive positions along a single component, with selected stops 20 being positioned by leadscrews 40 and brought to their operative positions to station the component so that successive locations are brought opposite datum position X where the working operation is performed.

The relative dispositions of the various components and the sequence of operation may be varied and adapted to many tasks without departing from the scope of this invention as defined in the following claims.

We claim:

1. A method of positioning an elongate workpiece so that it may be worked at any preselected point along its length, including the steps of:

passing the workpiece from a working tool onto a longitudinal conveyor, selecting a stop from a plurality of such stops serially spaced from said working tool over at least part of the length of the conveyor, adjusting the relative longitudinal position of the working tool and a common structure carrying said stops, the distances between the stops being uniform, and placing said selected stop in the path of the workpiece to arrest its further progress on the conveyor, said common structure being permitted to move under the control of pneumatic cushioning means relative to the conveyor longitudinally over a limited distance on impact of said workpiece against the selected stop, and including the step of employing said pneumatic cushioning means to reverse the common structure after it has so moved to reposition the selected stop a preselected distance from said working tool.

2. A method according to claim 1, including the step of clamping the workpiece against a side fence adjacent said working tool after it has had its further progress along the conveyor arrested by the selected stop, and the stop has been repositioned.

3. Apparatus for positioning an elongate workpiece so that it may be worked at any preselected location along its length, including:

a. a work station incorporating a working tool, b. a longitudinal conveyor for passing the workpiece in a direction away from the working tool, c. a series of stops uniformly spaced apart over at least part of the length of the conveyor, any selected one of which may be brought into the path of the workpiece to arrest its further progress on the conveyor, d. a common structure which carries the stops and which is reciprocable relative to the conveyor longitudinally over a stroke at least equal to the spacing between adjacent stops, and e. means for adjusting the longitudinal position of the common structure to any preselected point within said stroke, f. pneumatic cushioning means interposed between the common structure and the adjusting means for the structure, and operative when the workpiece abuts the selected stop, to absorb shock on impact by permitting limited longitudinal movement of the common structure relative to the conveyor, g. said cushioning means including pneumatic ram means operating on the common structure for reversing the structure after abutment of the workpiece with the selected stop to bring the preselected location of the workpiece accurately to position at the work station.

4. Apparatus according to claim 3 including a driven outfeed roller located on one side of said working tool, said outfeed roller being adjacent one end of said conveyor which extends longitudinally away from the work station.

5. Apparatus according to claim 4, wherein there is disposed alongside the said conveyor, the said common structure carrying said stops, said structure comprising a longitudinally extending beam supported for reciprocal sliding movement longitudinally relative to said working tool.

6. Apparatus according to claim 5, wherein said stops comprise levers pivotally mounted on the beam and including for each stop a fluid-operated ram device for individually effecting pivotal movement of its associated stop to an operative position where said stop is at least partially disposed over said conveyor.

7. Apparatus according to claim 5, including a plurality of guide rollers mounted on said beam, said rollers being aligned and serially spaced from said working tool.

8. Apparatus according to claim 5, including a carriage member mounting a pneumatic cylinder for a pneumatically operated ram rigidly attached to said beam, said carriage being mounted for longitudinal sliding movement said apparatus also including a leadscrew in threaded engagement with said carriage with rotation of the leadscrew effecting longitudinal movement of the carriage.

9. Apparatus according to claim 4, wherein said conveyor is in the form of a plurality of rollers.

10. Apparatus according to claim 4, wherein said conveyor is in the form of an endless belt.

11. Apparatus according to claim 10, wherein said belt is driven.

12. Apparatus according to claim 3, wherein the means for adjusting said common structure carrying the said stops includes a leadscrew mechanism.

13. Apparatus according to claim 12, including a positional gear box for effecting and controlling rotation of the leadscrew.

14. Apparatus according to claim 3, wherein said work station includes a fixed frame, a trunnion mounted for rotational movement about a generally vertical axis in said frame, a cranked arm depending from the trunnion and a rotary saw having its driving motor mounted for vertical sliding movement on the cranked arm, said apparatus also including a worm drive screw in mesh with a pinion fixed on the trunnion for effecting at least partial rotation of said trunnion and with it said saw drive motor and said saw about said vertical axis.

15. Apparatus according to claim 14, including a fluid cylinder device carried on said cranked arm, a ram operating in said cylinder and connected to said saw motor, and including means for supplying pressure fluid to said cylinder to effect movement relative thereto of the said ram, whereby to effect vertical sliding movement of the said saw motor relative to the said cranked arm.

16. Apparatus according to claim 14, including a remotely controlled positional gear box for effecting and controlling rotation of the said worm drive screw.

17. Apparatus according to claim 3, including clamping means for holding the workpiece against a fixed fence adjacent the working tool after its preselected location has been brought to position at the work station.